3,203,773
BORON-CONTAINING FUEL COMPOSITION
Herbert Landesman, Covina, Calif., assignor to Olin Mathieson Chemical Corporation, a corporation of Virginia
No Drawing. Filed Oct. 25, 1960, Ser. No. 64,954
4 Claims. (Cl. 44—51)

This invention relates to fuel compositions and in particular to fuel compositions in which finely-divided boron is slurried in n-propylpentaborane.

In recent years considerable attention has been directed to the problem of preparing liquid fuels having high heat of combustion values per unit volume suitable for use in ramjets, aircraft gas turbines and the like. It has been found that hydrocarbon fuels which have the required physical properties for use in the devices mentioned are limited in heat of combustion values to about $1 \times 10^6$ B.t.u./ft.$^3$. Attempts to prepare a satisfactory fuel having a heat of combustion value greater than $1.75 \times 10^6$ B.t.u./ft.$^3$ in which finely-divided solids of high calorific value are suspended or slurried in a liquid fuel base have up to this time been unsuccessful. In general the slurry fuels prepared to date have not performed successfully in engines because their combustion efficiency was low, the slurries could not be pumped consistently, ignition temperatures were not uniform, combustion products in many cases fouled the engines and thermal and chemical stabilities were unsatisfactory. Slurry fuels, in order to be useful, must be capable of being stored for long periods of time without deterioration and without separation of the finely-divided solid material from the liquid phase.

In the past in the preparation of slurry fuels it has been found necessary to add a jelling agent, to prevent the finely-divided solid materials from depositing out of the slurry on storage and also to add a dispersing agent, or surfactant to form a film around the solid particles so that the surface area per unit weight remains high and agglomeration tendencies are reduced to a minimum.

Surprisingly it has been found that highly valuable, slurry fuels having a calorific value in excess of $1.75 \times 10^6$ B.t.u./ft.$^3$ can be prepared by slurrying finely-divided boron in n-propylpentaborane without the use of jelling agents or dispersants. The compound, n-propylpentaborane, which is a valuable, liquid, high-energy fuel, can be prepared by the method described in Altwicker, Garrett, and Weilmuenster application Serial No. 497,408, filed March 28, 1955, now Patent No. 3,038,012.

PREPARATION OF BORON FOR THE SLURRY

The finely-divided boron utilized in this invention is exemplified by amorphous boron or by active boron prepared as described below.

(A) *Amorphous boron.*—Commercial amorphous boron can be produced, for example, by the magnesium reduction of boric oxide. The amorphous boron so produced is then crushed and sized to form a suitable material for the preparation of slurries.

(B) *Active boron.*—Active boron as prepared by the method described in the Herbert Landesman and George N. Tyson, Jr., application Serial No. 64,955, filed of even date herewith and entitled Product and Process can be employed in the preparation of these valuable slurry fuels. In this process active boron is produced by heating in a heating zone a mixture of boron hydrides higher than decaborane derived by the pyrolysis of diborane to a temperature of between 300° and about 650° C. under reduced pressure, removing the evolved gases and recovering active boron. The resulting product after being finely-divided is suitable for use in preparing the valuable slurry fuels of this invention. The heat of combustion of amorphous boron based on solid products at 25° C. is $3.6 \times 10^6$ B.t.u./lb. In general, the slurry fuel compositions of this invention are prepared by admixing the finely-divided boron with n-propylpentaborane. The unique and valuable properties of n-propylpentaborane as a slurrying agent are illustrated by the fact that slurried fuels with desirable properties can be formed without the use of jelling agents or dispersants. The particle size of the finely-divided boron employed in the preparation of the slurry fuels of this invention can be varied widely from about 300 microns to about 50 microns with the preferred size being from about 250 microns to about 60 microns. The quantity of finely-divided boron which can be incorporated in the slurry fuel compositions of this invention can likewise be varied widely from about 15 to 65 percent or more of boron by weight based on the total weight of the composition. The preferred fuel compositions of this invention contain from about 40 to about 65 percent of boron by weight, based on the total weight of the composition.

Although highly desirable fuels can be prepared from amorphous boron slurried in n-propylpentaborane, it is possible to prepare even more valuable fuels of this type from active boron and n-propylpentaborane. Slurry fuels prepared with active boron have been found in actual tests to sustain burning much better than slurry fuels prepared with other types of commercial, finely-divided, amorphous boron. In addition it has been found that it is possible to incorporate a higher percentage by weight of active boron in n-propylpentaborane than is possible using commercial amorphous boron.

This invention is further illustrated by the following specific examples:

*Example I*

In a dry-box 50 grams of n-propylpentaborane is measured out and placed in a beaker. Then 50 grams of amorphous commercial boron, having a particle size less than 60 mesh and containing 90 to 92 percent boron is admixed with the liquid n-propylpentaborane in the dry box. Before being used, the amorphous boron is placed in a vessel which is evacuated and then pumped on for a period of 24 hours to remove any adsorbed gases from the surface of the boron. The resulting fuel composition is found to be stable on standing for long periods of time and possesses viscosity characteristics desirable for pumping into an engine. The heat of combustion of this fuel composition is about $1.8 \times 10^6$ B.t.u./ft.$^3$.

*Example II*

In this example 47.9 grams of n-propylpentaborane is weighed out in a dry box and placed in a beaker. Then 52.1 grams of amorphous boron of the same type as used in Example I and having the same particle size is admixed with the liquid n-propylpentaborane. As in Example I, the result is a fuel composition in which the solid, amorphous boron remains suspended in the liquid base over long periods of time. Before being admixed with the n-propylpentaborane, the amorphous boron is placed in a vessel which is evacuated and pumped on for a period of 24 hours to remove any absorbed gases from surface of the boron material. The heat of combustion of the resulting fuel composition is in excess of $1.8 \times 10^6$ B.t.u./ft.$^3$.

*Example III*

N-propylpentaborane in the amount of 49.5 grams is weighed out in a dry box and placed in a beaker. In the next step 50.5 grams of active boron having a particle size of about 100 mesh prepared as described in the aforementioned Herbert Landesman and George N. Tyson, Jr., application Serial No. 64,955, filed of even date herewith and entitled Product and Process is admixed with the liquid n-propylpentaborane. Before the active boron is admixed with the n-propylpentaborane it is placed in a vessel which is evacuated and then pumped on for a period of 24 hours to remove any adsorbed gases.

The resulting slurried fuel composition is stable on standing for long periods of time and has a heat of combustion of about $2.1 \times 10^6$ B.t.u./ft.$^3$.

*Example IV*

In an inert atmosphere 63.8 grams of active boron of the same type and particle size as utilized in Example III is admixed with 36.2 grams of n-propylpentaborane. The active boron before being admixed with the n-propylpentaborane is pretreated in the same manner as described in Example III. The resulting stable, slurry fuel composition has a heat of combustion value of about $2.25 \times 10^6$ B.t.u./ft.$^3$.

The compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the slurry fuel compositions of this invention, the local fuel to air ratio in the zone of fuel injection should also be approximately stoichiometric, assuming that the boron, carbon and hydrogen of the n-propylpentaborane burn to boric oxide, carbon dioxide, and water vapor and that the finely-divided boron burns to boric oxide. In the case of a mixture comprising 50 percent by weight of finely-divided boron with the remainder being n-propylpentaborane this local fuel to air ratio is approximately 0.093. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the compositions of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

Because of their high chemical reactivity and heating values, the compositions of this invention can be employed as fuels in ramjet engines and in afterburning and other auxiliary burning schemes for the turbojet and bypass or ducted type engines. The operating conditions of afterburning or auxiliary burning schemes are usually more critical at high altitudes then those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristics of the slurry fuels of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-after-burning performance of a gas turbine-afterburner combination is also possible because the high chemical reactivity of the products of this invention eliminates the need of flameholding devices within the combustion zone of the afterburner. When employed in an afterburner, the slurry fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet the liquid fuels of this invention

What is claimed is:

1. A composition of matter suitable for use as a fuel consisting essentially of a finely-divided material selected from the group consisting of amorphous boron and active boron dispersed in n-propylpentaborane, the amount of said finely divided material being at least 15 percent by weight based on the total weight of the composition.

2. A composition according to claim 1 in which the said finely-divided material is present in an amount of from about 40 to about 65 percent by weight based upon the total weight of the composition.

3. A composition according to claim 1 in which the said finely-divided material is amorphous boron.

4. A composition according to claim 1 in which the finely-divided material is active boron.

References Cited by the Examiner

UNITED STATES PATENTS

| | | | |
|---|---|---|---|
| 2,573,471 | 10/51 | Malina et al. | 52—.5 |
| 2,968,917 | 1/61 | Whaley | 60—35.4 |
| 2,987,554 | 6/61 | Levy et al. | 260—606.5 |
| 3,006,141 | 10/61 | Becker | 60—35.4 |

OTHER REFERENCES

Report National Advisory Committee for Aeronautics, pages 2–4 (1953).

DANIEL E. WYMAN, *Primary Examiner.*

LEON D. ROSDOL, CARL D. QUARFORTH,
*Examiners.*